United States Patent
Allebrod et al.

(10) Patent No.: US 11,859,504 B2
(45) Date of Patent: Jan. 2, 2024

(54) SEAL ARRANGEMENT FOR A SPLIT HOUSING

(71) Applicant: Siemens Energy Global GmbH & Co. KG, Bayern (DE)

(72) Inventors: Dirk Allebrod, Oberhausen (DE); Stephan Klän, Berlin (DE); Stephan Sonnen, Essen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 268 days.

(21) Appl. No.: 17/298,547

(22) PCT Filed: Sep. 19, 2019

(86) PCT No.: PCT/EP2019/075206
§ 371 (c)(1),
(2) Date: May 29, 2021

(87) PCT Pub. No.: WO2020/119966
PCT Pub. Date: Jun. 18, 2020

(65) Prior Publication Data
US 2022/0025783 A1    Jan. 27, 2022

(30) Foreign Application Priority Data
Dec. 13, 2018 (EP) .................... 18212293

(51) Int. Cl.
*F01D 25/24* (2006.01)
*F16J 15/02* (2006.01)
*F16J 15/08* (2006.01)

(52) U.S. Cl.
CPC ............ *F01D 25/24* (2013.01); *F16J 15/027* (2013.01); *F16J 15/0887* (2013.01); *F05D 2240/55* (2013.01)

(58) Field of Classification Search
CPC . F01D 25/24; F16J 15/027; F16J 15/02; F16J 15/0887
See application file for complete search history.

(56) References Cited

U.S. PATENT DOCUMENTS

| 3,659,662 | A | * | 5/1972 | Dicky | ................... F16C 35/061 277/420 |
| 5,738,490 | A | * | 4/1998 | Pizzi | ....................... F01D 11/08 415/173.1 |

(Continued)

FOREIGN PATENT DOCUMENTS

| CN | 1539050 A | 10/2004 |
| DE | 102007001459 A1 | 7/2007 |

(Continued)

OTHER PUBLICATIONS

PCT International Search Report and Written Opinion of International Searching Authority dated Nov. 11, 2019 corresponding to PCT International Application No. PCT/EP2019/075206 filed Sep. 19, 2019.

*Primary Examiner* — Long T Tran
(74) *Attorney, Agent, or Firm* — Wolter Van Dyke Davis, PLLC

(57) ABSTRACT

A seal arrangement for sealing a gap between two housing parts, the gap being situated between opposite end faces of the housing parts. In the first housing part, there is a first receiving groove on the first end face, in which first receiving groove a sealing strip is arranged which protrudes out of the receiving groove and lies against a first outer flank. The sealing strip engages in an opposite second receiving groove of the second housing part and lies against a second outer flank. For position securing purposes and to achieve a sealing effect, even if there is no differential pressure, a (Continued)

spiral strip is provided, which spiral strip is situated in the first receiving groove and exerts an elastic force on the sealing strip.

20 Claims, 2 Drawing Sheets

(56) References Cited

U.S. PATENT DOCUMENTS

| | | | | |
|---|---|---|---|---|
| 5,975,844 | A * | 11/1999 | Milazar | F01D 11/005 |
| | | | | 277/648 |
| 9,212,564 | B2 * | 12/2015 | Langlois | F01D 9/042 |
| 9,863,475 | B2 * | 1/2018 | Sakaguchi | F16C 33/58 |
| 10,202,861 | B2 * | 2/2019 | Vogel | F01D 25/24 |
| 2003/0123979 | A1 * | 7/2003 | Mohammed-Fakir | |
| | | | | F16J 15/0887 |
| | | | | 415/209.2 |
| 2004/0109761 | A1 * | 6/2004 | Scherrer | F01D 25/243 |
| | | | | 415/206 |
| 2006/0045746 | A1 | 3/2006 | Synnott | |
| 2007/0154305 | A1 | 7/2007 | Arness | |
| 2015/0132054 | A1 * | 5/2015 | Dreischarf | F01D 25/24 |
| | | | | 29/525.08 |
| 2015/0260291 | A1 * | 9/2015 | Lutaud | F16J 15/002 |
| | | | | 277/562 |
| 2016/0237838 | A1 * | 8/2016 | Kennedy | F02C 6/12 |
| 2017/0067355 | A1 * | 3/2017 | Vogel | F01D 11/003 |
| 2018/0171812 | A1 | 6/2018 | Haegert | |
| 2018/0306120 | A1 * | 10/2018 | Shi | F16J 15/441 |
| 2019/0383171 | A1 | 12/2019 | Blessing | |

FOREIGN PATENT DOCUMENTS

| | | |
|---|---|---|
| DE | 102013111561 A1 | 4/2015 |
| EP | 2525047 A1 | 11/2012 |
| EP | 2915960 A1 | 9/2015 |
| EP | 3000983 A1 | 3/2016 |
| RU | 2031287 C1 | 3/1995 |

* cited by examiner

SEAL ARRANGEMENT FOR A SPLIT HOUSING

CROSS REFERENCE TO RELATED APPLICATIONS

This application is the US National Stage of International Application No. PCT/EP2019/075206 filed 19 Sep. 2019, and claims the benefit thereof. The International Application claims the benefit of European Application No. EP18212293 filed 13 Dec. 2018. All of the applications are incorporated by reference herein in their entirety.

FIELD OF INVENTION

The present invention concerns a housing formed from at least two housing parts, wherein the two housing parts must be sealed against one another. For this, many types of seal arrangement are known from the prior art. Irrespective of whether the housing parts abut each other with the end face of the housing wall or have a respective flange, at least one housing part has a continuous groove along the connecting site in which a sealing element is arranged. Furthermore, embodiments are known in which a groove is arranged in both opposing housing parts, wherein the sealing element extends along the opposing grooves and covers the gap between the two flanges.

BACKGROUND OF INVENTION

Irrespective of the actual embodiment of the known solutions, there is a conflict between firstly achieving an advantageous seal and secondly ensuring simple mounting of both the seal in the groove of one housing part, and in particular the mounting of the second housing part on the first housing part with pre-fitted seal. This often leads to the problem that, on installation, in particular of especially heavy and large housing parts, either there is a risk of damaging the seal or the desired sealing effect cannot be achieved.

SUMMARY OF INVENTION

An object of the present invention is therefore to provide a seal arrangement which both ensures an advantageous mounting and achieves an advantageous seal, wherein in particular a usage is possible with large heavy housing components, for example of a gas turbine.

The object concerned is achieved by an embodiment according to the invention following the teaching of the independent claim. Advantageous embodiments are the subject of the subclaims.

The generic seal arrangement serves for sealing a gap between two housing parts. Here, a first housing part has a first end face, and a second housing part has a second end face opposite the first end face. The two housing parts are joined together at the end faces so that a gap is formed between the end faces. In this respect, it is irrelevant whether the end faces lie completely or just partially on each other. At least the seal arrangement is necessary since a completely tight, gap-free contact of the end faces on one another over their entire length cannot be guaranteed. To this extent, the seal arrangement serves to seal the possible but not necessarily present gap between the end faces.

Furthermore, generically a seal arrangement on housing parts is only required in cases in which a pressure difference exists which would otherwise lead to a passage of media through the gap. The seal arrangement is only useful and only effective in cases in which a media pressure on an inside is greater than or at least equal to a media pressure on an outside opposite the inside. If we consider the housing parts with the opposing end faces and the gap to be sealed between them, the inside lies on one side and the outside on the opposite side of the gap. The inside need not necessarily coincide with the interior of the housing, nor the outside with the exterior of the housing. If, in the interior of the housing, a lower pressure is intended to prevail than that surrounding the housing, then the outside is in the interior (i.e. the side with the lower pressure).

Furthermore, the generic seal arrangement comprises a first receiving groove in the first housing part. Here, the first receiving groove runs along the first end face and opens towards the opposite second end face. Furthermore, it is necessary that a second receiving groove is present along the opposite second end face in the second housing part, and opens towards the first housing part. To create a respective sealing surface at the receiving grooves, the flank of the first receiving groove pointing towards the outside forms a first outer flank, and the flank of the second receiving groove pointing towards the outside forms a second outer flank.

Generically, the seal arrangement comprises a sealing element which extends along the two receiving grooves and engages in both opposite receiving grooves. The sealing element lies both on the first outer flank and also on the second outer flank and thus achieves the seal.

To allow simple mounting but still ensure a best possible seal, according to the invention it is provided that, to implement the sealing element, a sealing strip is inserted along the receiving groove; said strip has a flat form and extends firstly along the receiving groove and secondly transversely to the end faces. The sealing strip here bears on the two outer flanks substantially over the entire length of the receiving grooves.

To guarantee the position of the sealing strip in particular in the first receiving groove, firstly to allow mounting of the second housing part after mounting of the sealing strip, and secondly to guarantee a secure contact of the sealing strip on the two outer flanks irrespective of media pressure, a helical strip is used which extends along the first receiving groove and is clamped in the first receiving groove under elastic deformation in the radial direction of the helical strip, thus applying a radial force onto the sealing strip.

By the use of a simple sealing strip in combination with the use of the helical strip according to the invention, both simple mounting is achieved and also the tightness can be substantially guaranteed.

The seal arrangement may be used both on the opposing end faces of walls of the housing parts and advantageously also in a flange connection of the housing parts. Here, each housing part has at least one flange running along the end faces, wherein accordingly the flange faces which come to bear on one another form the end faces.

A both simpler and more advantageous design for the first receiving groove is achieved by a design with rectangular cross-section. This allows simple production, and also the position of the sealing strip may be adequately secured by the helical strip. Furthermore, the outer flank may advantageously be machined to guarantee the seal.

However, to achieve the desired tightness, it is particularly advantageous if the second outer flank has a sloping or arcuate cross-section. In other words, the second outer flank does not extend in an extension of the first outer flank, but rather slopes relative to the first outer flank in a straight line or in a curve. In this way, the defined contact of the sealing strip both on the first outer flank and also on the second outer flank can advantageously be influenced.

Here, it is furthermore particularly advantageous if a theoretical extension of the first outer flank intersects the second outer flank approximately in the middle. The middle here relates to half the depth of the second receiving groove, starting from the second end face to the groove base of the second receiving groove. The geometric arrangement of the intersection line between the extension of the first outer flank and the second outer flank is regarded as approximately in the middle if the distance, viewed from the middle perpendicularly to the second end face, amounts to at most 20% of the depth of the second receiving groove.

It is advantageous here if an outer end of the second outer flank, as an edge to the second end face, is arranged spaced from the first outer flank pointing towards the outside.

This advantageous design of the second receiving groove with a sloped or arcuate course, in which the extension of the first outer flank intersects the second outer flank approximately in the middle, and the advantageous arrangement of the outer end of the second outer flank offset towards the outside, mean that on joining of the second housing part to the first housing part, the end face adjacent to the second receiving groove does not unintentionally hit the sealing strip protruding from the first receiving groove. Rather, the slope or arcuate course leads to the sealing strip being threaded into the second receiving groove.

It is furthermore advantageous if an inner end of the second outer flank, as an edge to the groove base of the second receiving groove towards the inside, is arranged spaced from a theoretical extension of the first outer flank.

The sloping or arcuate course with the intersection line approximately in the middle of the second outer flank, and the advantageous arrangement of the inner end of the second outer flank offset towards the inside, mean that during assembly, the sealing strip reliably bears not only on the first outer flank but also on the second outer flank.

Accordingly, a simple and reliable mounting is made possible, which can also guarantee the required sealing effect.

If chamfers or roundings are present on the inner end or outer end of the second outer flank, these should be regarded in the theoretical extension as a theoretical edge between the second outer flank and the groove base or the second end face respectively.

A particularly advantageous design with sloping or arcuate course of the second outer flank is achieved if the distance of the outer end of the second outer flank from the first outer flank corresponds to at least 2 times the distance of the inner end from the theoretical extension of the first outer flank. In other words, starting from approximately the middle towards the end face, the second outer flank slopes approximately twice as greatly as the course towards the groove base.

Furthermore, a particularly advantageous design is achieved if the distance of the outer end from the first outer flank corresponds to at least 0.2 times the width of the first receiving groove. Thus, with careful mounting, an impact of the second housing part on the sealing strip during mounting is avoided. However, it is advantageous if the distance of the outer end from the outer flank is no greater than 0.4 times the width of the first receiving groove. This ensures that the sealing strip can be reliably threaded into the second receiving groove and not unintentionally kinked over.

The distance of the inner end of the second outer flank from the theoretical extension of the first outer flank is particularly advantageously less than 0.1 times the width of the first receiving groove. As a general rule, this deviation from the extension of the first outer flank is sufficient to guarantee a reliable contact of the sealing strip on the second outer flank. However, it is advantageous if the distance of the first end from the extension of the first outer flank corresponds to maximum 0.2 times the width of the first receiving groove.

To guarantee a reliable seal by means of the sealing strip with contact on the first outer flank and the second outer flank, in particular taking into account a sloping or arcuate course of the second outer flank, it is advantageous if the width of the sealing strip corresponds to at least 0.8 times the depth of the receiving groove. It is particularly advantageous if the width corresponds to at least 0.9 times the depth of the receiving grooves. The depth of the receiving grooves is here defined by the distance of the first groove base of the first receiving groove to the second groove base of the second receiving groove. Here, the width of the sealing strip should correspond at most to the depth of the two receiving grooves.

BRIEF DESCRIPTION OF THE DRAWINGS

In the figures which follow, an exemplary embodiment of a seal arrangement according to the invention and exemplary designs of the second outer flank are illustrated. The drawings show.

DETAILED DESCRIPTION OF INVENTION

Figure 1:
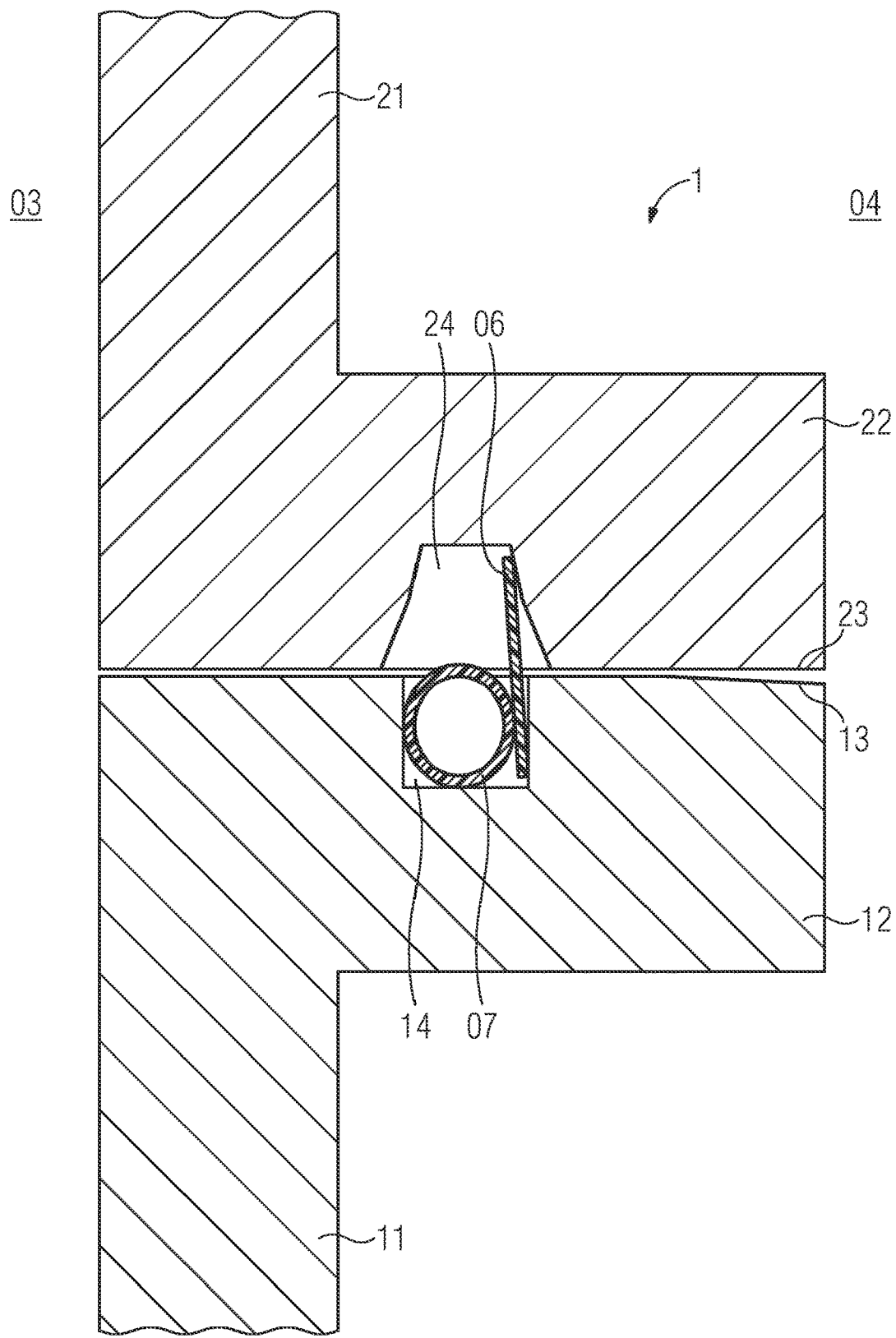
FIG. 1 shows an example of the seal arrangement according to the invention between two housing flanges.

FIG. 1 shows an exemplary embodiment of a seal arrangement 01 according to the invention, wherein portions of a first housing part 11 (lower side) and a second housing part 12 (upper side) are shown with a respective flange 12, 22. The opposing flange faces here form the first end face 13 of the first housing part 11 and the second end face 23 of the second housing part 21. The gap which must be sealed by means of the seal arrangement 01 is defined between the end faces. On one side of the gap or end faces 13, 23 is the inside 03, and opposite this the outside 04. The seal arrangement 01 is effective in cases in which the media pressure on the inside 03 corresponds at least to the media pressure on the outside 04.

Figure 2:
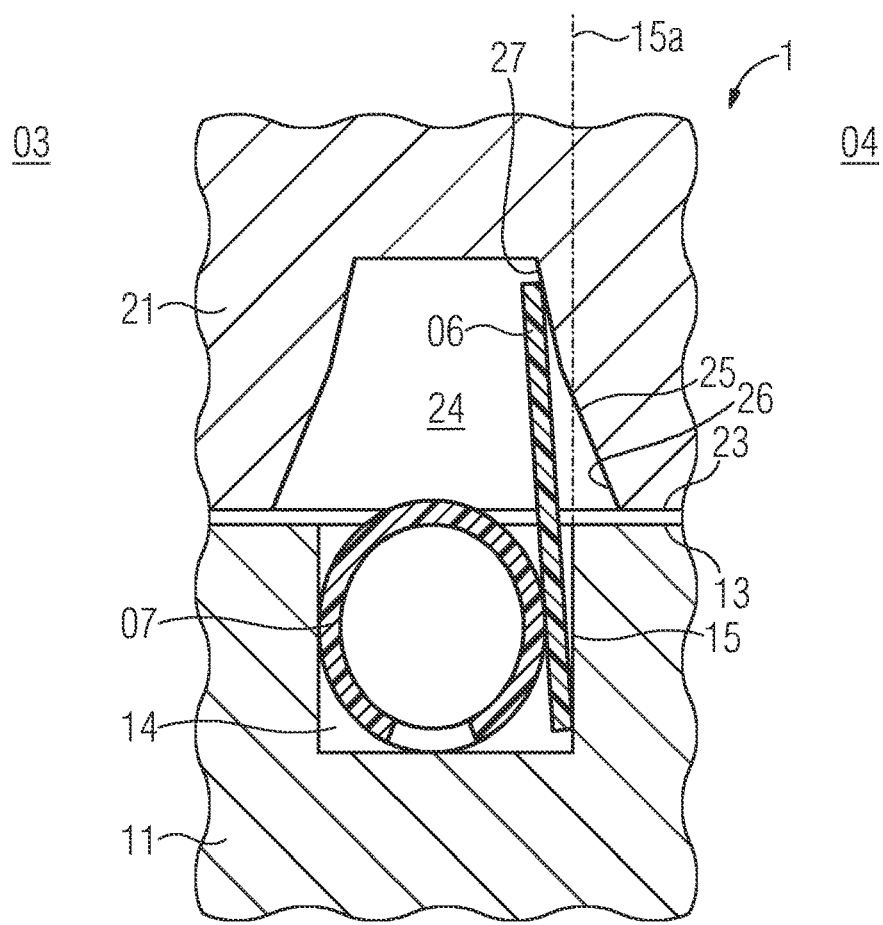
FIG. 2 shows a detail view of the design from FIG. 1.

The seal arrangement 01 is advantageously shown in the detail view in FIG. 2. This shows firstly the first receiving groove 14 in the first housing part 11. Said groove 14 has a simple and advantageous rectangular design. The flank of the first receiving groove 14 pointing towards the outside 04 forms the first outer flank 15. Opposite this in the second housing part 21 is the second receiving groove 24, which also has a second outer flank 25 on the side pointing towards the outside 04.

The seal arrangement 01 here comprises firstly the sealing strip 06 achieving the seal, which extends along the receiving grooves 14, 24 and transversely to the end faces 13, 23. It is clearly evident that here the sealing strip 06 has a particularly simple, flat form. The sealing strip 06 bears with one side edge on the first outer flank 15 and with the second side edge on the second outer flank 25. The sealing effect is achieved firstly by the pressure difference between the inside 03 and the outside 04. To guarantee an initial seal, in particular at low pressure differences, and in particular to secure the position of the sealing strip 06 during mounting, the seal arrangement 01 furthermore comprises a helical strip 07 extending along the first receiving groove 14. Here, it is provided that the helical strip 07 is clamped under slight pressure in the first receiving groove 14 between an inner flank and the first outer flank 15 or the sealing strip 06. This elastic deformation of the helical strip 07 here creates a radial force applied by the helical strip 07 on the sealing strip 06, so that the latter is pressed onto the first outer flank 15 and the second outer flank 25.

Furthermore, the particularly advantageous design of the second outer flank 25 can be seen, which has a sloping course with respect to the first outer flank 15. Here, an extension 15a of the first outer flank 15 is shown. It is evident that an outer end 26 of the second outer flank 25, at the second end face 23, has a distance from the first end face 15 or its extension 15a, and is thus arranged offset towards the outside 04. In contrast, an inner end 27 of the second outer flank 25, at the groove base of the second receiving groove 24, is offset towards the inside 03 and arranged spaced from the extension 15a of the first outer flank 15.

It is evident that when the second housing part 21 is joined to the first housing part 11, this arcuate or sloping course of the second outer flank 25, with the pre-mounted arrangement of the sealing strip 06 and helical strip 07, leads to the sealing strip 06 being threaded into the second receiving groove 24. Furthermore, it is evident that thanks to the sloping course, with the offset pointing towards the inside 03 above the middle of the second flank 25, it can be guaranteed that in mounted state, the sealing strip 06 in any case bears reliably on the second outer flank 25.

Figure 3:
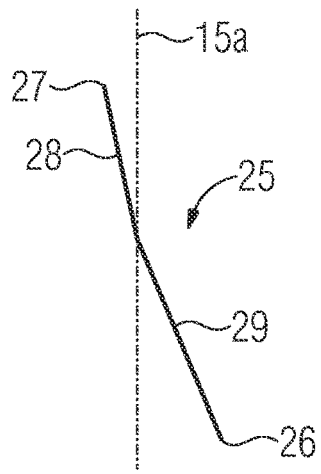
FIGS. 3 to 5 show exemplary profiles for the second outer flank.
Figure 4:
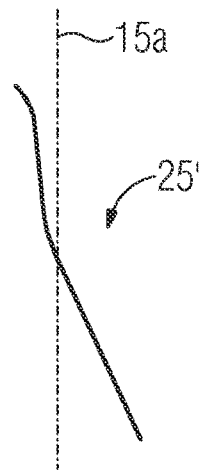
Figure 5:
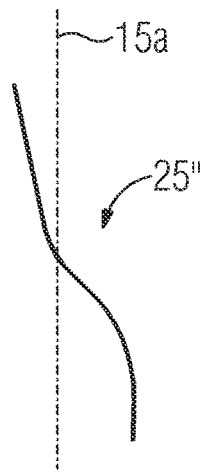

An essential aspect for the particularly advantageous design is the sloping or arcuate course of the second outer flank 25. For this, FIGS. 3 to 5 show further possible designs, each with respect to the extension 15a of the first outer flank 15. FIG. 3 shows the outer flank formed from two straight sloping portions, wherein the portion pointing towards the outer end 26 slopes more greatly than the portion pointing towards the inner end 27. FIG. 4 shows the arcuate course of the second outer flank 25' starting from the middle towards the inner end 27. In contrast, FIG. 5 shows an exemplary embodiment in which the second outer flank 25" has an arcuate course in its path towards the outer end 26.

The invention claimed is:

1. A seal arrangement for sealing a gap between a first housing part having a first end face, and a second housing part having a second end face opposite the first end face; wherein the gap is defined between the end faces from an inside that lies on one side of the gap to an outside on an opposite side of the gap, wherein the seal arrangement is suitable for use with a lower media pressure on the outside and a higher media pressure on the inside; wherein in the first housing part, a first receiving groove is arranged which runs along the gap and opens towards the second end face and has a first outer flank pointing towards the outside; and wherein in the second housing part, a second receiving groove is arranged which is opposite the first receiving groove and has a second outer flank pointing towards the outside; the seal arrangement comprising:
 a sealing strip which runs along the receiving grooves and has a flat form extending transversely to the end faces and bears against both outer flanks; and
 an elastic helical strip, the center axis of which is arranged inside the first receiving groove and which extends along the first receiving groove and exerts a pressure force on the sealing strip;
 wherein a cross-section of the second outer flank has a sloping and/or arcuate course.

2. The seal arrangement as claimed in claim 1, wherein the two end faces are flange faces of the housing lying upon one another.

3. The seal arrangement as claimed in claim 1, wherein the first receiving groove and the second receiving groove have a form with mirror-symmetrical cross-section.

4. The seal arrangement as claimed in claim 1, wherein the first receiving groove is designed substantially rectangular in cross-section.

5. The seal arrangement as claimed in claim 1, wherein a theoretical extension of the first outer flank intersects the second outer flank in the middle, +/−20%, of a depth of the second receiving groove.

6. The seal arrangement as claimed in claim 5, wherein an outer end of the second outer flank at the second end face is arranged spaced from the first outer flank towards the outside, and an inner end of the second outer flank at the groove base of the second receiving groove is arranged spaced from the theoretical extension of the first outer flank towards the inside.

7. The seal arrangement as claimed in claim 6, wherein a distance of the outer end from the first outer flank corresponds to at least 2 times a distance of the inner end from the first outer flank; and/or
 wherein the distance of the outer end from the first outer flank corresponds to at least 0.2 times and/or at most 0.4 times a width of the first receiving groove; and/or
 wherein the distance of the inner end from the first outer flank corresponds to at least 0.1 times and/or at most 0.2 times the width of the first receiving groove.

8. The seal arrangement as claimed in claim 1, wherein a width of the sealing strip corresponds to at least 0.8 times a depth of the two receiving grooves.

9. The seal arrangement as claimed in claim 8, wherein the width of the sealing strip corresponds to at least 0.9 times the depth of the two receiving grooves.

10. The seal arrangement as claimed in claim 8, wherein the width of the sealing strip corresponds to at most the depth of the two sealing grooves.

11. The seal arrangement as claimed in claim 1, wherein an outer end of the second outer flank at the second end face and an inner end of the second outer flank at an edge of a groove base of the second receiving groove are on opposite sides of an extension of the first outer flank.

12. The seal arrangement as claimed in claim 1, wherein an outer end of the second outer flank at the second end face is offset from an extension of the first outer flank towards the outside and an inner end of the second outer flank at an edge of a groove base of the second receiving groove is offset from the extension towards the inside.

13. The seal arrangement as claimed in claim 12, wherein a first distance that the outer end of the second outer flank is offset from the extension towards the outside is greater than a second distance that the inner end of the second outer flank is offset from the extension towards the inside.

14. The seal arrangement as claimed in claim 13, wherein the first distance is at least 2 times the second distance.

15. The seal arrangement as claimed in claim 1, wherein the first end face on opposite sides of the first receiving groove are aligned and wherein the second end face on opposite sides of the second receiving groove are aligned.

16. The seal arrangement as claimed in claim 1, wherein the second outer flank has the sloping comprising two straight sloping portions including a first straight sloping portion extending from an inner end of the second outer flank at an edge of a groove base of the second receiving groove and a second straight sloping portion extending to an outer end of the second outer flank at the second end face, wherein the second straight sloping portion has a greater slope than the first straight sloping portion relative to an extension of the first outer flank.

17. The seal arrangement as claimed in claim 1, wherein the second outer flank has the arcuate course that extends to an inner end of the second outer flank at an edge of a groove base of the second receiving groove.

18. The seal arrangement as claimed in claim 1, wherein the second outer flank has the arcuate course that extends to an outer end of the second outer flank at the second end face.

19. A seal arrangement for sealing a gap between a first housing part having a first end face and a second housing part having a second end face opposite the first end face; wherein the gap is defined between the end faces from an inside that lies on one side of the gap to an outside on an opposite side of the gap, wherein the seal arrangement is suitable for use with a lower media pressure on the outside and a higher media pressure on the inside; wherein in the first housing part, a first receiving groove is arranged which runs along the gap and opens towards the second end face and has a first outer flank pointing towards the outside; and wherein in the second housing part, a second receiving groove is arranged which is opposite the first receiving groove and has a second outer flank pointing towards the outside; the seal arrangement comprising:

a sealing strip which runs along the receiving grooves and has a flat form extending transversely to the end faces and bears against both outer flanks; and an elastic helical strip, the center axis of which is arranged inside the first receiving groove and which extends along the first receiving groove and exerts a pressure force on the sealing strip;

wherein an outer end of the second outer flank at the second end face and an inner end of the second outer flank at an edge of a groove base of the second receiving groove are on opposite sides of an extension of the first outer flank.

20. The seal arrangement as claimed in claim 19, further comprising the first housing part and the second housing part.

\* \* \* \* \*